June 1, 1965  H. D. KUBACH ETAL  3,187,233

MONITORING DEVICE

Filed Nov. 18, 1960

INVENTORS
HANS D. KUBACH
AND JOHN C. MARTIN
BY John F. Luhrs
ATTORNEY

United States Patent Office 3,187,233
Patented June 1, 1965

3,187,233
MONITORING DEVICE
Hans D. Kubach, Waterbury, Conn., and John C. Martin, Wickliffe, Ohio, assignors to Bailey Meter Company, a corporation of Delaware
Filed Nov. 18, 1960, Ser. No. 70,280
12 Claims. (Cl. 317—146)

This invention relates to devices for detecting malfunctions and more particularly to a monitoring device for detecting the malfunction of an electric circuit.

Our invention has particular utility in connection with the detection of malfunctions in a computing circuit, particularly the commonly employed operational amplifier circuit. As is well known to those skilled in the art such a circuit includes a summing point, the potential of which is zero volts during normal operation of the circuit. If a malfunction should occur, however, a positive or negative potential will exist at the summing point. Thus by monitoring the potential at the summing point a manifestation of the operating condition of the operational amplifier circuit can be obtained.

The summing point potential during even a malfunction may not exceed a few tenths of a volt. For this reason the usual types of voltage responsive devices such as electro-mechanical relays are not capable of being utilized directly to detect a summing point potential. Amplifying devices are needed to produce a potential of magnitude sufficient to operate control or alarm devices.

A further consideration in the monitoring of such a summing point is the fact that any detector connected to the summing point must present a high impedance thereto to prevent loading of the summing point and an interference with the normal operation of the circuit.

Due to the above considerations, the accurate monitoring of a summing point in a computer circuit has been a complex engineering problem which in the past has not been satisfactorily solved. It is therefore a principal object of our invention to accurately monitor the potential at a point in an electric circuit without interferring with the normal operation of the circuit.

Another object of the invention is to detect the existence of very small negative or positive potentials at a summing junction in a computer circuit by means of a high impedance oscillator circuit.

Another object of the invention is to provide a multistage amplifier oscillator circuit having inter-stage negative A.-C. feedback to produce a high input impedance.

Another object to the invention is to produce a change in the oscillatory state of an oscillator circuit in response to a change in potential of a point in an electric circuit.

Other objects and advantages will become apparent from the following description taken in connection with the accompanying drawings wherein.

Figures 1, 2:
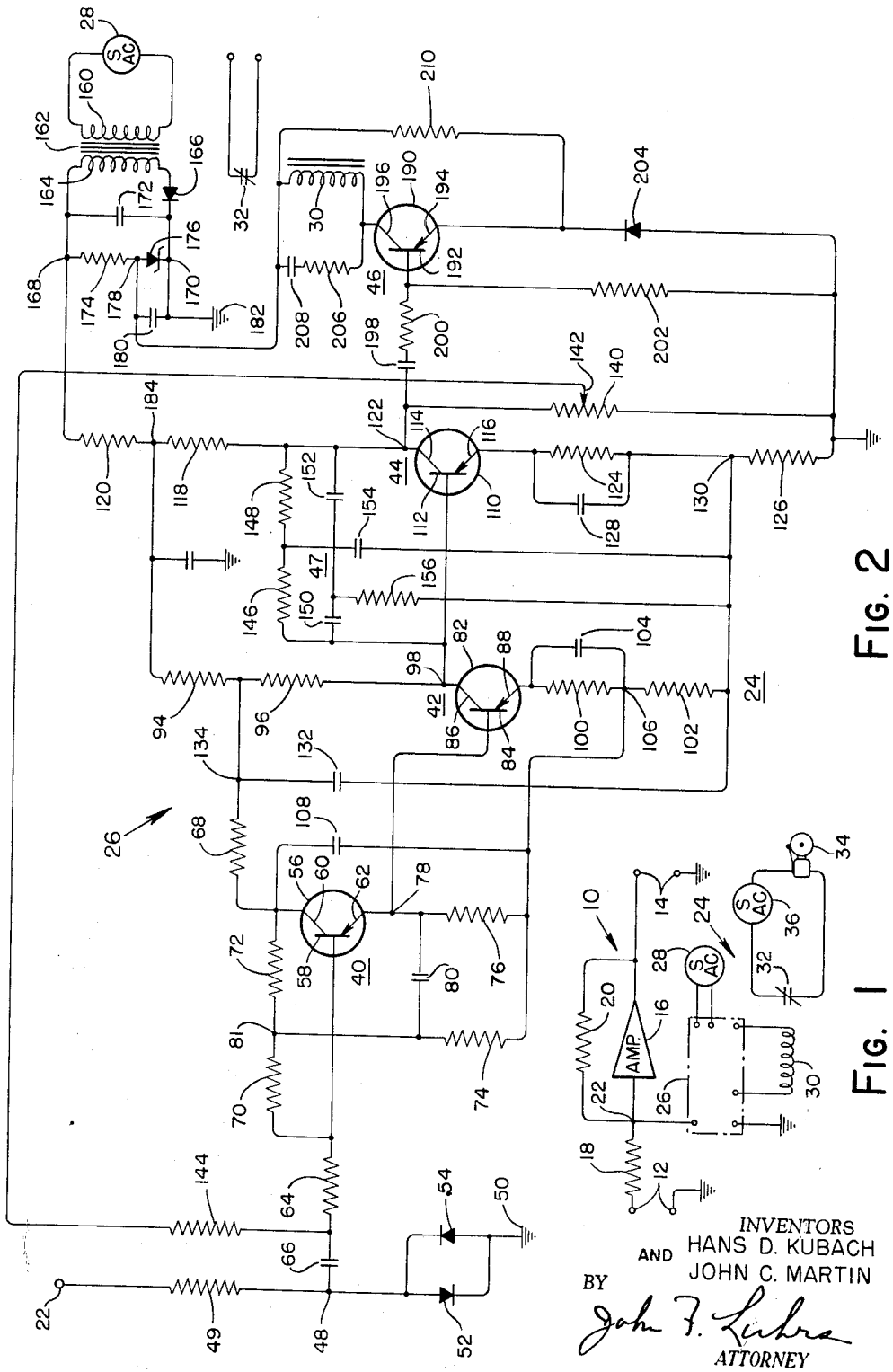
FIG. 1 is a schematic illustration in block diagram of an operational amplifier circuit and a summing point monitor embodying our invention.
FIG. 2 is a schematic circuit diagram of the summing point monitor.

Referring more particularly to FIG. 1 of the drawings, there is shown an operational amplifier circuit 10 having input terminals 12 and output terminal 14. The circuit 10 includes a high gain D.-C. amplifier 16 having a passive input impedance comprising a resistance 18 and an external feedback circuit comprising a passive impedance or resistance 20. As is well known to those skilled in the art, such an operational circuit is effective to produce an amplified output voltage signal at output terminals 14 which may have desired characteristics depending on the type and circuitry of the passive impedances 18 and 20. In the embodiment shown wherein the passive impedances 18 and 20 are resistances, a pure proportional output voltage is obtained at terminals 14 in response to an input signal applied to terminals 12, the gain of the circuit depending on the relative magnitudes of the resistances.

The feedback loop of the circuit 10 is connected to the input of amplifier 16 forming a summing point or junction 22. During normal operation of the circuit 10 the amplifier 16 functions to produce a feedback current through resistance 20 which will equal the input current through resistance 18 to thus establish a null condition and a substantially zero potential at terminal 22. Thus, at any instant during normal operation of the circuit 10 the potential at junction 22 will be zero, the existence of a positive or negative potential at the junction indicating a malfunction in the circuit.

In accordance with the objects of our invention we provide a monitoring circuit 24 for manifesting a condition of malfunction of the circuit 10. The monitoring circuit 24 is effective to detect the presence of a positive or negative potential at junction 22 and to actuate a manifesting device such as alarm or to initiate a desired corrective action depending on the particular application of the circuit 10. In general the monitoring circuit 24 comprises an electric oscillator circuit 26 having an input connected to junction 22 and energized by a suitable A.-C. source 28. As will later be described in more detail the oscillator 26 is provided with an output circuit including a relay 30 which is adapted to be energized during a condition of oscillation of said oscillator and to be deenergized during the non oscillatory condition of said oscillator. The contacts 32 of relay 30 may be arranged to control energization of an alarm device 34 from a suitable source 36 or to perform other desired functions.

Referring now to FIG. 2 of the drawings the oscillator circuit 26 comprises amplifying stages 40, 42 and 44, an output stage 46 for controlling energization of the relay coil 30, and a twin T type filter circuit 47 for producing oscillation of the circuit 26 at a predetermined frequency.

The first stage of amplification 40 is provided with an input terminal 48 which is connected to summing junction 22 through a resistor 49 and which is connected to a ground at 50 by diodes 52 and 54 during the existence of positive or negative potentials respectively at junction 22 as will be described later in more detail in connection with the operation of the entire system. The stage 40 in general comprises a modified emitter follower current amplifier with provision for A.-C. feedback to the input to achieve a high input impedance at terminal 48. More particularly, the stage 40 includes a transistor 56 having a base electrode 58, a collector electrode 60 and an emitter electrode 62. The base 58 is connected to input terminal 48 through a resistor 64 and a coupling capacitor 66 while a D.-C. bias voltage is applied to collector 60 through resistor 68. The emitter 62 circuit includes a load resistor 76 and a stage output terminal 78 which is connected to the input of stage 42 and which is connected through capacitor 80 to terminal 81. As will later be described in more detail, capacitor 80 is operative to feed A.-C. back into the input circuit to raise the input impedance at terminal 48.

The second stage 42 similarly comprises a transistor 82 having a base electrode 84, an emitter electrode 88 and a collector electrode 86. The base electrode 84 is coupled to terminal 78 in the emitter circuit of transistor 56 to receive the output signal of stage 40. Collector 86 is supplied with D.-C. bias through resistors 94 and 96 and provided with a terminal 98 at which the output potential of stage 42 is established.

A pair of biasing resistors 100 and 102 are connected in series with the emitter 88 and serves to compensate for temperature effects in the stage 42. A by-pass capacitor 104 is connected in parallel with resistor 100. The common junction 106 of the resistors 100 and 102 is connected through a capacitor 108 to the collector 60 of transistor 56 and to the common junction of resistors 72 and 68 to feed back the A.-C. signal conducted by transistor 82 into stage 40 to in effect further raise the input impedance at terminal 48.

The stage 44 similarly comprises a transistor 110 having a base electrode 112, a collector electrode 114 and an emitter electrode 116. The collector 114 is connected to a pair of serially connected biasing resistors 118 and 120 and provided with an output terminal 122 which is coupled to the output stage 46. Base electrode 112 is coupled to output terminal 98 of stage 42 while emitter electrode 116 is connected in series with a pair of resistors 124 and 126 indentical in function to the resistors 100 and 102 respectively. A by-pass capacitor 128 shunts the resistor 124 similar to capacitor 104. The common junction 130 of resistors 124 and 126 is connected through a capacitor 132 to terminal 134 to establish A.-C. feedback to the prior stage 42.

A slidewire resistance 140 is connected between the output terminal 122 of stage 44 and ground and is provided with a movable contact arm 142 which is connected through resistor 144 to the input of stage 40. The twin T filter circuit 47 is effective to establish regenerative feedback from contact arm 142 to the input of stage 40 at a particular frequency depending on the size of the circuit components and to establish degenerative feedback at all other frequencies. When this feedback is regenerative the circuit will oscillate to produce a maximum output voltage at terminal 122.

The twin T filter circuit 47 comprises a pair of resistors 146 and 148 connected in series between the terminals 98 and 122 and in parallel with a pair of capacitors 150 and 152. The common junction of resistors 146 and 148 is connected by a capacitor 154 to terminal 130 while the common junction of capacitors 150 and 152 is connected by a resistor 156 to terminal 130.

Referring now to the bias circuits for stages 40, 42 and 44, the source 28 is connected to the primary winding 160 of a transformer 162 having a secondary winding 164 connected in series with a diode rectifier element 166 to establish a half wave rectified negative potential at terminal 168 with respect to grounded terminal 170. A filter capacitor 172 is effective to smooth the D.-C. signal in a manner well known to those skilled in the art. A resistor 174 is connected in series with a voltage regulating Zener diode 176 across terminals 168 and 170 to establish at junction 178 an intermediate regulated potential to which the output stage 46 is connected. An additional filter capacitor 180 is connected from terminal 178 to ground at 182 in parallel with the Zener diode 176 to establish additional filtering of the voltage supplied to the output stage 46.

To complete the bias circuits for stages 40, 42 and 44 the terminal 168 is connected through resistors 120 and 118 to collector 114 of transistor 110 while the common junction 184 of resistors 118 and 120 is connected through resistors 94 and 96 to collector 86 of transistor 82. The common junction of resistors 94 and 96 is similarly connected through resistor 68 to collector 60 of transistor 56. With this arrangement a filtered half wave rectified bias signal of the proper magnitude to establish steady state conduction is supplied to the stages 40, 42 and 44.

Referring now to the output stage 46, a transistor 190 is provided with a base electrode 192, an emitter electrode 194 and a collector electrode 196. The base 192 is connected by a coupling capacitor 198 and a dropping resistor 200 to the output terminal 122 of stage 44 and connected through a voltage divider resistor 202 to ground. The emitter 194 is connected to ground through diode 204 which as will later be described establishes a predetermined negative bias on the emitter 194 to prevent conduction of transistor 190 when the oscillator is in a non-oscillatory state.

The collector 196 of transistor 190 is connected through relay coil 30 to terminal 178 in the bias circuit. A time delay circuit comprising a serially connected resistor 206 and capacitor 208 is connected in parallel with the relay coil 30 to establish a predetermined time delay prior to the energization or deenergization of relay coil 30. To complete the circuitry of the output stage 46 a resistor 210 connects terminal 178 to the emitter electrode 194 and cooperates with diode 204 to establish the negative bias on the emitter 194.

Before turning to the description of the operation of the overall system it is desired to describe the specific operation and advantages of the output stage 46 in connection with the control of energization of relay 30. When the oscillator 26 is in a condition of oscillation a D.-C. voltage of substantial magnitude having an A.-C. component will appear at terminal 122. The capacitor 198 blocks the D.-C. signal to apply a sinusoidal A.-C. signal to the base of transistor 190. During a portion of the negative half cycle of the A.-C. signal the base 192 will be more negative than the emitter 194 thus causing the transistor to conduct during alternate half cycles to establish energization of relay coil 30 and opening contacts 32.

When the oscillator 26 is in a non-oscillatory state, the input to base electrode 192 of transistor 190 will be zero and it is desired that transistor 190 will be non-conductive to effect deenergization of relay coil 30. Normally at this condition the base electrode 192 would be at the potential of the emitter electrode 194 or ground potential to render the transistor 190 non-conductive. However, due to the inherent characteristics of transistors it has been found that some conduction may occur as a result of temperature effects or other conditions. To prevent this the resistor 210 and diode 204 are provided to establish a predetermined negative bias on the emitter 194 to insure that the emitter 194 will be more negative than the base 192 thus insuring non-conductance of the transistor 190 when the oscillator 26 is in a non-oscillatory state.

The resistor 210 and diode 204 are effective to establish a predetermined bias voltage on the emitter 194 in the order of 0.5 volt. In effect the resistor 210 and diode 204 form a voltage divider network having a common junction to which the emitter 194 is connected. The polarity arrangement of diode 204 is such that conductance of the same will normally occur to establish a low impedance in the circiut and a potential at the common junction in the order of 0.5 volt.

In operation of the overall system, the operational amplifier circuit 10 during normal operation of the amplifier 16 will produce a potential of substantially zero at summing junction 22 as previously described. At this condition the diodes 52 and 54 will be non-conductive and the impedance thereof will be maximum. As a result oscillation of the circuit 26 will occur to effect energization of the relay 30 which may be arranged to control energization of the alarm 34 as shown in FIG. 1 or to effect some other desired action. In the arrangement shown the contacts 32 of relay 30 are arranged to be normally closed to thereby effect deenergization of alarm 34 during the oscillatory state of circuit 26.

If a positive potential should occur at junction 22 due to a malfunction of circuit 10, diode 52 will become conductive and the impedance thereof in the oscillator circuit 26 will decrease resulting in termination of the oscillatory state of oscillator 26. In effect the diode 52 when conductive grounds the input of oscillator 26 rendering the same inoperative. As a result the potential of terminal 122 will become zero and relay 30 will be deenergized to close contacts 32 and energize alarm 34 to manifest a malfunction.

Similarly the existence of a negative potential at junction 22 representative of a malfunction will result in conductance of diode 54 and a decrease in the circuit impedance thereof to also terminate the oscillatory state of oscillator 26 and effect deenergization of relay coil 30 to energize alarm 34. Thus, upon the occurrence of either a positive or negative potential at junction 22 the system will function to energize alarm 34 by terminating the oscillatory state of oscillator 26.

The advantages of the monitoring device herein disclosed will now be apparent. Since the diodes 52 and 54 will become conductive upon the occurrence of even a very small potential at junction 22 the system is sensitive to a potential in the order of 0.5 volt. Due to the provision of three amplifier stages in oscillator 26 with negative A.-C. feedback from each stage as established by capacitors 80, 108 and 132 the impedance of the oscillator circuit 26 presented to the circuit of summing junction 22 is very high to render the operation of the operational amplifier circuit 10 substantially uneffected by the provision of the monitoring device. The output stage 46 of the circuit 26 provides positive control over the energization of relay coil 30 even during extreme temperature conditions due to the provision of resistor 210 and diode 204 which established predetermined bias potential on emitter 194 as previously described.

A further important feature of the system is the incorporation of the time delay circuit comprising resistor 206 and capacitor 208 in the output stage 46. This circuit is effective to limit response of the detector to actual conditions of malfunction preventing response thereof to temporary occurring conditions which may for an instant cause the existence of a potential at summing junction 22.

It will be apparent to those skilled in the art that the monitoring device disclosed is not limited to the monitoring of a single circuit point but may be arranged to monitor simultaneously several points through the provision of additional resistors 49 connected to the added points. Upon the existence of a potential at any one of the points termination of the oscillatory state of oscillator 26 will occur to effect energization of relay 30.

Many circuit arrangements other than that as shown are possible within the scope of my invention. It has been found however that the circuit disclosed in FIG. 2 is operative as described when the circuit elements have the following values or ratings:

| | |
|---|---|
| Resistor 49 | 30 meg. |
| Resistor 64 | 1 meg. |
| Resistor 70 | 20K. |
| Resistor 72 | 12K. |
| Resistor 74 | 36K. |
| Resistor 76 | 27K. |
| Resistor 68 | 13K. |
| Resistor 94 | 7.5K. |
| Resistor 96 | 16K. |
| Resistor 100 | 18K. |
| Resistor 102 | 3.6K. |
| Resistor 124 | 27K. |
| Resistor 126 | 10 ohms. |
| Resistor 118 | 13K. |
| Resistor 120 | 6.8K. |
| Resistor 140 | 500K. slidewire. |
| Resistor 146 | 50K. |
| Resistor 148 | 50K. |
| Resistor 156 | 25K. |
| Resistor 174 | 15K. |
| Resistor 200 | 5K. |
| Resistor 144 | 100 meg. |
| Resistor 206 | 1K. |
| Resistor 210 | 100K. |
| Resistor 202 | 5K. |
| Capacitor 66 | 0.1 mfd., 100 v. |
| Capacitor 80 | 250 mfd., 3 v. |
| Capacitor 108 | 100 mfd., 50 v. |
| Capacitor 104 | 50 mfd., 250 v. |
| Capacitor 132 | 500 mfd., 50 v. |
| Capacitor 128 | 50 mfd., 50 v. |
| Capacitor 150 | .028 mfd., 100 v. |
| Capacitor 152 | .028 mfd., 100 v. |
| Capacitor 198 | 10 mfd., 50 v. |
| Capacitor 172 | 100 mfd., 100 v. |
| Capacitor 208 | 250 mfd., 25 v. |
| Capacitor 180 | 100 mfd., 50 v. |
| Diode 52 | IN300. |
| Diode 54 | IN300. |
| Diode 176 | Zener diode. |
| Diode 166 | IN538. |
| Transistor 40 | 2N519A. |
| Transistor 42 | 2N655. |
| Transistor 44 | 2N655. |
| Transistor 46 | 2N655. |
| Source 28 | 115 v., 60 cycle. |

While only one embodiment of the invention has been herein shown and described, it will be apparent to those skilled in the art that many changes may be made in the construction and arrangement of parts without departing from the scope of the invention as defined in the appended claims.

What we claim and desire to secure by Letters Patent of the United States is:

1. A malfunction detector for an electric circuit having a circuit terminal at zero potential during normal functioning of the circuit, comprising, an electric oscillator having oscillatory and non-oscillatory states provided with an input circuit connected to the circuit terminal, an output circuit having a current flow therein of one magnitude during the non-oscillatory state of said oscillator and a current flow therein of a different magnitude during the oscillatory state of said oscillator, a feedback circuit connected from the output circuit to the input circuit to provide positive feedback during the oscillatory state of said oscillator, a first variable impedance device connected to said input circuit responsive to the existence of a zero potential at the circuit terminal to maintain one of said oscillatory states and responsive to the existence of a positive potential at the circuit terminal to maintain the other oscillator state, a second variable impedance device connected to said input circuit responsive to the existence of a zero potential at the circuit terminal to maintain said one oscillatory state and responsive to the existence of a negative potential at the circuit teminal to maintain said other oscillatory state, and means connected to said output circuit to manifest the existence of said oscillatory and non-oscillatory states of said oscillator.

2. A malfunction detector as claimed in claim 1 wherein said first and second variable impedance devices comprise electric diodes respectively having opposite polarity arrangement with respect to said input circuit and the circuit terminal.

3. A malfunction detector as claimed in claim 2 wherein said oscillator comprises a 3 stage amplifier circuit having a twin-T type of filter circuit for producing oscillations.

4. A malfunction detector as claimed in claim 2 wherein said oscillator circuit comprises an amplifier having first, second and third stages of amplification each comprising an electric transistor coupled to a source of bias voltage, a feedback circuit from said second and third stages to the preceding stage for establishing negative feedback to the preceding stage and a high oscillator input impedance, a positive feedback circuit from said third stage to said first stage, and a filter circuit coupled between said second and third stages for establishing regenerative oscillation of said amplifier at a predetermined frequency.

5. An oscillator circuit including an amplifier having first, second and third stages of amplification each comprising an electric transistor coupled to a source of bias voltage and having emitter, base and collector electrodes; an A.-C. feedback circuit from the output to the input of said first stage to establish a high A.-C. input impedance, an A.-C. feedback circuit from said second stage to said first stage to further increase the A.-C. input impedance, an A.-C. feedback cicuit from said third stage to said first stage to establish a further increase in A.-C. input impedance, a positive feedback circuit from the collector electrode of said third stage to the base electrode of said first stage, and a filter circuit coupled between said second and third stages for establishing regenerative oscillation of said amplifier at a predetermined frequency.

6. An oscillator circuit as set forth in claim 5 wherein each of said feedback circuits comprises a capacitor connecting the emitter electrode circuit of said stages to the input circuit.

7. An oscillator circuit as claimed in claim 5 wherein said filter circuit comprises a twin-T type of filter circuit.

8. A control circuit comprising, an electric oscillator having oscillatory and non-oscillatory states, said oscillator including a three-stage amplifier employing interstage A.-C. feedback, an output circuit connected to the third stage of said amplifier, said output circuit having maximum output signal conditions during the oscillatory state of said oscillator, a feedback circuit connected from the third stage to the first stage of said amplifier to provide positive feedback during the oscillatory state of said oscillator, an input circuit connected to the first stage of said amplifier and responsive to a change in a variable for controlling oscillation of said oscillator, electrically operative means connected to said output circuit to be energized thereby during the oscillatory state of said oscillator to manifest the existence of said oscillatory state, and a time delay circuit connected to said manifesting means to delay energization and deenergization of said manifesting means for a predetermined time after commencement and termination of oscillation respectively.

9. A control circuit as claimed in claim 8 wherein said output circuit includes an electric transistor having a base electrode connected to the output of said oscillator, a collector electrode connected to a negative power source and an emitter electrode connected to ground.

10. A control circuit as claimed in claim 9 wherein said electrically operative means comprises an electric relay coil connected in series with said collector and said power source, said transistor being biased conductive by the oscillator output during oscillation to energize said relay coil.

11. A control circuit as claimed in claim 10 wherein said time delay circuit comprises a resistor connected in series with an electric capacitor in a parallel circuit with said relay coil.

12. A control circuit as claimed in claim 11 wherein a diode rectifier is connected in series with said emitter electrode and a resistence is connected from said power source to said emitter electrode to establish a predetermined negative bias on said emitter to render said transistor non-conductive during the non-oscillatory state of said oscillator.

References Cited by the Examiner

UNITED STATES PATENTS

| | | | |
|---|---|---|---|
| 2,748,285 | 5/56 | Beaufoy | 331—172 X |
| 2,764,643 | 9/56 | Sulzer | 331—110 |
| 2,889,496 | 6/59 | Moore | 317—146 |
| 2,947,915 | 8/60 | Patchell | 317—146 |
| 2,955,213 | 10/60 | Schaeve | 331—172 X |
| 2,970,280 | 1/61 | Dulberger | 331—110 |
| 3,031,627 | 4/62 | Reichert et al. | 331—110 |
| 3,042,839 | 7/62 | Hermes | 317—146 |

OTHER REFERENCES

Parrish: Rectifiers and Circuits for D.C. Relays, Electronic Design, November 15, 1956, pp. 22–25.

SAMUEL BERNSTEIN, *Primary Examiner.*

LLOYD McCOLLUM, *Examiner.*